Aug. 24, 1943.  A. T. SCHEIWER  2,327,611
COUPLING
Filed Sept. 30, 1941
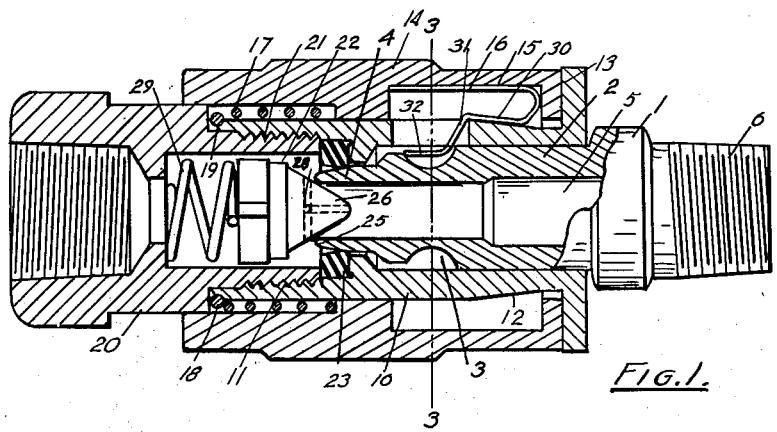
FIG. 1.
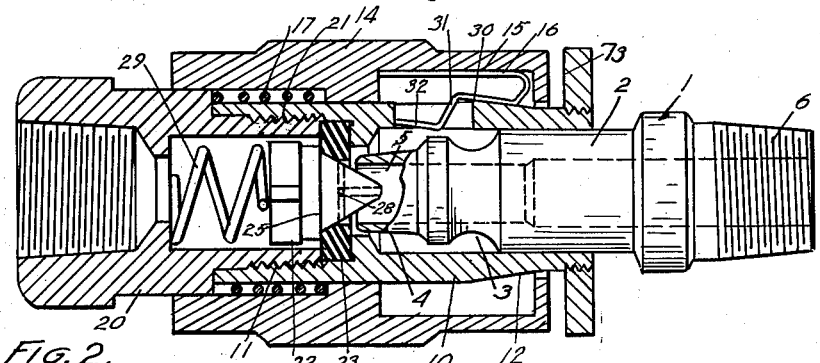
FIG. 2.
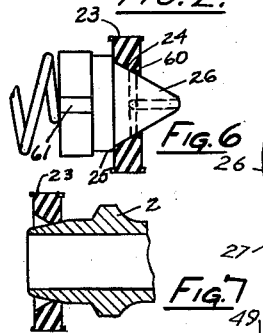
FIG. 6.
FIG. 7.
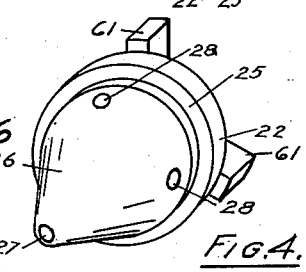
FIG. 4.
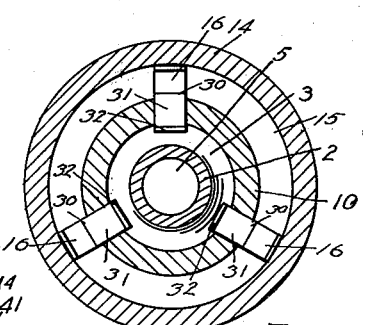
FIG. 3.
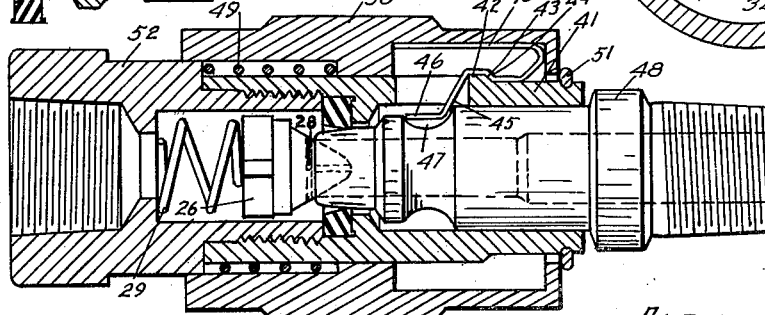
FIG. 5.
INVENTOR.
ALBERT T. SCHEIWER
BY
Florian G. Miller
ATTORNEY Patented Aug. 24, 1943

2,327,611

UNITED STATES PATENT OFFICE 2,327,611

COUPLING

Albert T. Scheiwer, Erie, Pa.

Application September 30, 1941, Serial No. 412,994

1 Claim. (Cl. 285—169)

This invention relates generally to couplings and more particularly to the snap type of coupling.

All couplings of this character made according to the teachings of the prior art and with which I am familiar have been costly in construction because of the ball members necessary to connect the male and female members of the coupling together.

It is accordingly an object of my invention to make a coupling which is very simple in design and construction and which is economical in manufacture, cost and maintenance.

Another object of my invention is to provide a novel check valve in the female member of the coupling.

Other objects of my invention will become evident from the following detailed description taken in conjunction with the accompanying drawing, in which:

Fig. 1 is a side-elevational view in cross-section, showing my novel coupling member in a locked position.

Fig. 2 is a side-elevational view in cross-section, showing my novel coupling in open position.

Fig. 3 is a view taken on the line 3—3 of Fig. 1.

Fig. 4 is a perspective view of my novel check valve for a coupling.

Fig. 5 is a side-elevational view in cross-section of a modified form of my novel coupling.

Fig. 6 is a fragmentary view showing the check valve seated on a washer.

Fig. 7 is a fragmentary view showing the connecting portion of the male member engaging a washer.

Referring now to the drawing, Fig. 1 shows a coupling comprising a male member 1, having a connecting portion 2 with an annular groove 3 and a reduced end portion 4. A longitudinally-extending aperture 5 passes through the center of the male member 1. The outer end of the male member 1 has a threaded portion 6 for connection to a hose or the like. The female member comprises an inner cylindrical shell 10 having an internally threaded portion 11, a tapered outer portion 12, and an annular shoulder 13. A sleeve 14 surrounds the cylindrical shell 10 and has a grooved portion 15 for receiving spring members 16. The sleeve 14 is urged against the shoulder 13 of the cylindrical member 10 by spring members 17 held in position by a spring stop member 18 forced in a groove 19 on the outer periphery of the cylindrical shell 10. A connecting member 20, having a threaded portion 21 is threadably engaged with the threaded portion 11 of the cylindrical member 10 and has disposed therein a check valve 22. An annular sealing member 23 is disposed in the cylindrical member 10 and provides a seat for the seating surface 25 of the check valve. The washer 23 has a tapered inner surface 24 and a straight portion 60 which contacts the connecting portion 2 of the male member 1 when they are connected together as shown in Fig. 7. The forward engaging portion 26 of the check valve 22 is conical in shape and has an aperture 27 extending inwardly from the nose thereof and apertures 28 extending radially outwardly from the interior thereof. The conical-shaped portion 26 of the check valve 22 extends into the aperture 5 in the male member 1 a distance less than that extending to the radially-extending apertures 28. This permits fluid to pass through the apertures 27 and 28 when the male and female members of the coupling are connected together. A spring 29 urges the conical-shaped portion 26 of the check valve 22 into the aperture 5 of the male member 1. When the male and female members of the coupling are disengaged, the spring 29 of the check valve 22 urges the seating surface 25 thereof against the annular sealing member 23, forming a seal, and the tapered nose portion 26 engages the tapered portion 24 of the washer 23 to provide a further sealing surface.

The check valve 22 is especially novel in that the conical-shaped nose portion 26 causes it to be self-centering when it moves longitudinally into the aperture 5 in the connecting portion 2 of the male member 1. The outwardly-extending guiding members 61 guide the check valve 22 while permitting a maximum amount of fluid to pass thereby. With the self-centering feature of this novel valve, the seating surface 25 thereof seats on the washer 23 in exact concentric alignment to form a perfect seal.

The spring members 16 are of generally U-shaped construction with the inner portion 30 thereof offset laterally and outwardly to form a contacting portion 32 which engages the groove 3 in the male member 1 to connect the male and female members together. The portion 30 of the spring member 16 is offset inwardly at an angle substantially the same as the angle made by the outer tapered surface 12 of the cylindrical member 10. It will be evident that when the sleeve 14 is moved relative to the cylindrical shell 10 against the force of the spring 17, the portion 30 of the spring member 16 moves along the tapered surface 12 of the cylindrical member 10, thereby lifting the engaging surface or portion 32 of the spring member 16 out of engagement with the groove 3 of the male member 1 to a position shown in Fig. 2. Upon release of the sleeve member 14 it will move against the shoulder 13 of the cylindrical member 10 and the engaging portion 32 of the spring member 16 will return to its position as shown in Fig. 1.

The construction shown in Fig. 2 is the same as in Fig. 1 with the exception that the spring stop 19 is eliminated and the annular member 73 is threaded onto the shell 10.

The modified form of my invention shown in Fig. 5 is the same as that shown in Fig. 1 with the exception of the shape of the spring member 40. The cylindrical member 41 has a shoulder 42 formed thereon with one side 43 thereof at an angle of about 45°. The spring member 40 is generally U-shaped with one portion 44 of the inner leg thereof offset inwardly at a 45° angle to engage the shoulder 42 of the cylindrical member 40, and the outer portion 45 of the inner leg is offset outwardly so that the engaging portion 46 thereof engages the groove 47 in the male member 48 of the coupling. The spring 49, urging the sleeve 50 forwardly against a spring stop member 51, is held in place by a connecting member 52. It will be evident that the engaging portion 46 of my modified form of construction moves upwardly at a much sharper angle than that of the spring shown in Fig. 1.

In operation, the sleeve 14 is forced against the spring 18 and the portion 30 of spring member 16 moves along the tapered portion 12 of the cylindrical member 10 which, in turn, moves the engaging portion 32 of the spring member 18 out of engagement with the groove 3 on the male member 1. With the engaging portion 32 of the spring member 18 out of engagement with the groove 3 of the male member 1, the male and female members may be disconnected. The connecting portion 2 of the male member 1 is merely inserted in the shell 10 of the female member without any movement of the sleeve 14 whatsoever when it is desired to connect the male and female members together. Upon insertion of the connecting portion 2 of the male member 1 in the female member, the conical portion 26 of the check valve 22 enters the longitudinal aperture 5 in the male member 1 and it is forced away from its seat 23, thereby permitting fluid to pass through the apertures 27 and 28 in the conical portion 26 of the check valve 22. The engaging portions 32 of the spring members 18 automatically move into the groove 3 on the connecting portion 2 of the male member 1, connecting the male and female members together. The operation is the same for the construction shown in Fig. 5.

From the foregoing, it will be evident that I have provided a coupling which has very efficient connecting means and which has a novel check valve, permitting a maximum flow of fluid for a given internal diameter of the male and female members.

Various changes may be made in the specific embodiment of the present invention without departing from the spirit thereof or from the scope of the appended claim.

What I claim is:

A coupling comprising a male member having a connecting portion with an annular groove, a cylindrical shell having a tapered shoulder portion, a sleeve telescopically disposed on said shell having a chamber formed therein adjacent said tapered shoulder portion and a generally U-shaped spring member having an off-set portion nested in said chamber in said sleeve and movable longitudinally therewith in engagement with the tapered shoulder portion of said male member to connect said male and female members together, said spring member being automatically movable out of engagement with the groove on the connecting portion of said male member when said sleeve is moved a predetermined distance on said shell.

ALBERT T. SCHEIWER.